INVENTORS.
Thomas A. Abbott
Jerome B. McMahon
BY
Robert A. Lavender
ATTORNEY

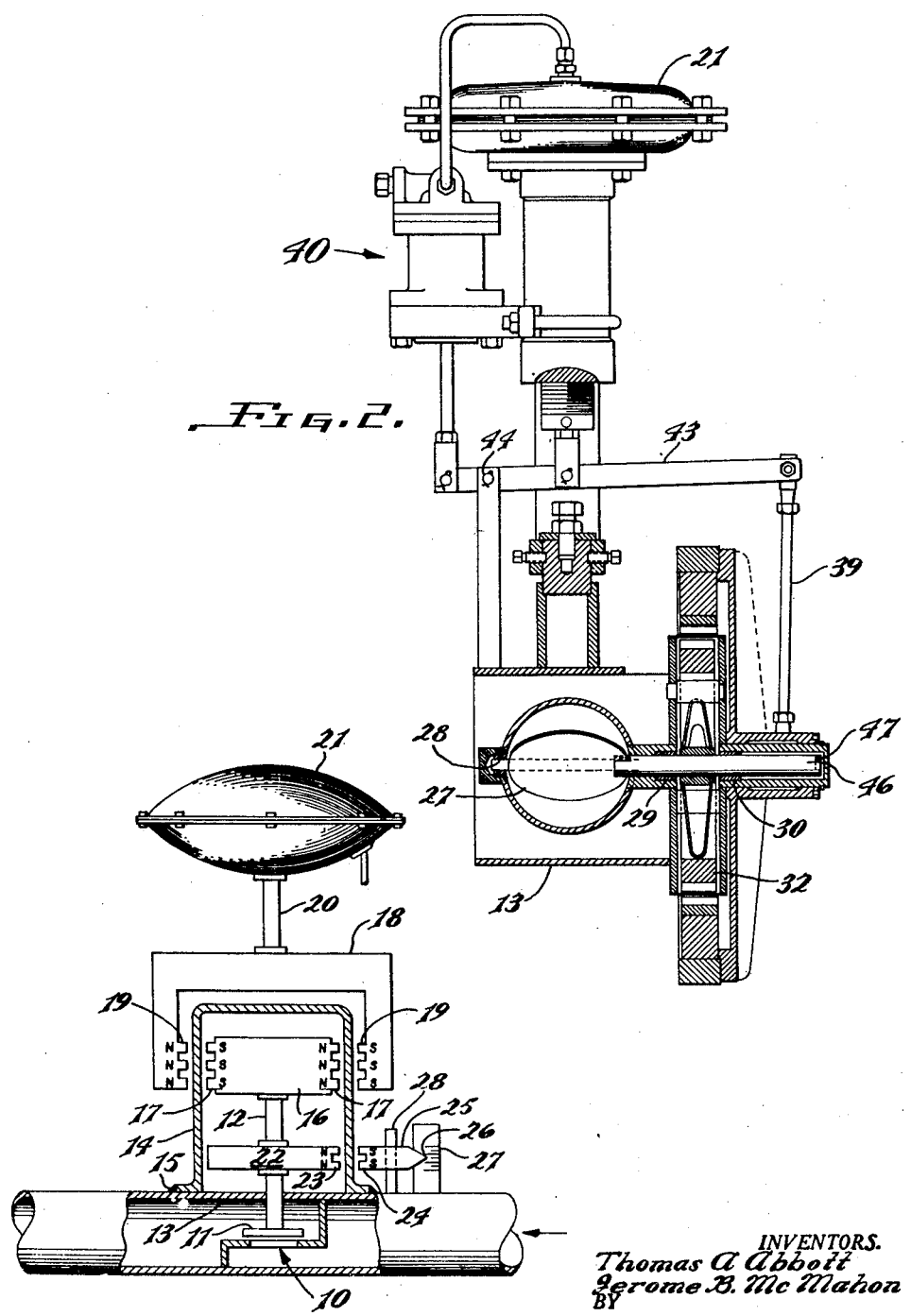

Patented Dec. 12, 1950

2,533,491

UNITED STATES PATENT OFFICE 2,533,491

VALVE CONTROL MECHANISM

Jerome B. McMahon, Wilmette, and Thomas A. Abbott, La Grange, Ill., assignors, by mesne assignments, to the United States of America as represented by the United States Atomic Energy Commission Application January 23, 1947, Serial No. 723,810

2 Claims. (Cl. 137—139)

This invention relates to new and useful improvements in control devices, and more particularly to valve operating devices of the magnetic type.

In many instances, particularly in industrial and experimental processes involving the handling or processing of highly corrosive fluids, such as gases, the use of the pressure of the corrosive fluid for flow control purposes and/or the control of the flow of such material is desirable. However, due to the corrosive nature of such fluids, neither conventional pressure-responsive control equipment nor conventional valve operating devices can be exposed to them nor can such devices and equipment be sealed in such a way as to exclude the possibility of leakage of the fluids from the confining equipment with resultant hazard to exposed equipment and operating personnel.

The processing of toxic and corrosive gases provides a good example of the foregoing problem. In the case of some of such gases, the process must be performed with extreme care in sealed apparatus operated at reduced pressure to prevent leakage of the gas into the surrounding atmosphere. Also such apparatus must be substantially proof against the inleakage of air, moisture and the like that may react adversely with the gas being processed. In such processes, gas pressures frequently must be carefully controlled, and in connection with this problem, valve operating means of the magnetic type are particularly efficient.

Of course, it is known to operate valves electromagnetically and this type of operation affords certain advantages with respect to sealing off a portion of the valve device, since a magnetic field requires no mechanical linkages for its transmission through any permeable medium, while a mechanical linkage must include a movable element passing through a packed joint that, in the case of highly corrosive and dangerous gases, cannot be rendered sufficiently leak proof for safe operation. A wire to an electromagnet, on the other hand, may be carried through the casing and sealed in a stationary position that, while not wholly satisfactory, is more leak proof than the packing arrangements employed for mechanical linkages. In the case of an electromagnet, however, the valve is generally susceptible of adjustment to but two positions, one of which is maintained by a spring or the like and the other of which is maintained by the solenoid against the thrust of the spring. A wider range of valve adjustment is not feasible in accordance with electromagnetic principles due to the complexity of the equipment necessary to provide a variable density flux and the requirement for maintaining a current flow over long periods of time.

It is, therefore, an object of this invention to provide a valve operating device of simple design, inexpensive to operate, and yet capable of effecting a wide range of valve adjustments by transmission of force through sealed housings.

It is contemplated according to this invention to operate a sealed valve assembly from a pressure responsive assembly by a transmission including a driving part and a driven part spaced apart and wholly isolated from each other except for a magnetic field therebetween.

It is a further object of this invention to provide means for maintaining a pressure differential between two zones by sensing the pressure in one of said zones as with a diaphragm valve motor and, in response to fluctuations in pressure, operating a valve controlling flow to the other zone in such a manner that leakage of corrosive gas incident to the maintenance of the desired differential is wholly prevented.

Other objects and advantages of this invention will be apparent from a consideration of the following detailed description of several embodiments thereof in connection with the annexed drawings wherein:

Fig. 1 is a view partially in section and partially in elevation of an intake control valve operated by a diaphragm motor through a magnetic transmission constructed in accordance with the present invention;

Fig. 2 is a view partially in section of a modified type of transmission for converting the linear movement of a valve motor to angular displacement of a butterfly valve.

Figure 3:
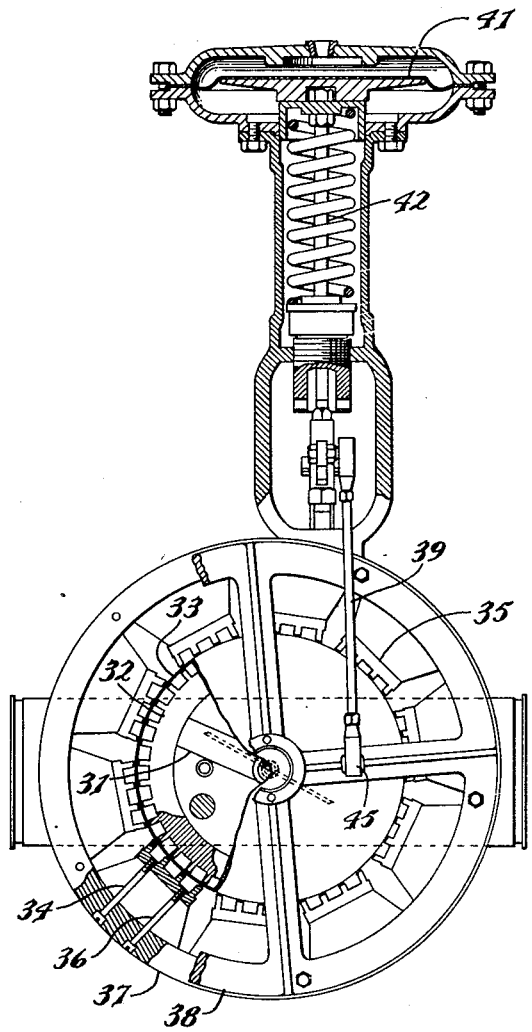
Fig. 3 is an other view partially in section of the valve shown in Fig. 2.

This invention may be more fully understood by reference to the drawings and in particular to the embodiment of Fig. 1, wherein a magnetically operated valve is shown controlling flow of fluid in a conduit. The valve assembly 10 includes a valve closure element 11 attached to a reciprocatable valve operating stem 12 that passes through and beyond the wall of conduit 13 through a packless joint into a housing 14. This housing is constructed of a thin, preferably non-magnetic material that is inert in the presence of the fluid passing through the conduit 13, the housing being sealed to the conduit at 15 to positively prevent the escape of fluid from the latter into the surrounding atmosphere. Thus the conduit 13 and housing 14 define in cooperation a sealed zone.

Within the housing 14 the valve stem 12 is provided with a permanent bar magnet 16 having a plurality of spaced pole pieces 17 at its opposite ends, the pieces at opposite ends being of opposite polarity and terminating close to the wall of housing 14. Without housing 14 another permanent magnet 18 is arranged with a plurality of pole pieces 19 in spaced registry with the corresponding pieces 17 of the housed magnet 16, the registering pole pieces 17 and 19 being of opposite polarity and being spaced apart such a small distance that the force of attraction is near its maximum.

The magnet 18 is supported by a rod 20 connected to and driven by the diaphragm type motor 21 that is entirely conventional in design. Thus, as pressure fluctuations flex the diaphragm motor 21, the rod 20 will move and this movement will be imparted to the magnet 18. The magnetic field between magnets 18 and 16 is of such strength that movements of the former will be followed by proportional and, in some instances, equal movements of the latter. Since the position of the valve element 11 is directly controlled by the position of the magnet 16 through connecting rod 12, flow through the conduit 13 is controlled by the movement of the diaphragm motor 21.

From a consideration of the foregoing it will be noted that the magnets illustrated not only served to open and close the valve but to hold it in any intermediate position of adjustment, the action of gravity on element 11 being a constant value as distinguished from a variable one such as that of a spring, the thrust of which changes with deflection.

Since the housing 14 is wholly sealed, there is no danger of leakage from the conduit 13 into the surrounding atmosphere incident to the operation of the valve 10. The flow control effected by valve 10 is, however, fully sensitive to movements of the diaphragm motor 21.

In order that an operator may be apprised of the position of the valve closure element 11 relative to its seat, another bar magnet 22 is mounted on the rod 12 within the housing 14, this magnet having closely spaced, similar pole pieces 23 acting through the wall of the housing 14 on pole pieces 24 of a bar magnet 25 having a pointed end 26 registering with a stationary scale 27. Bar magnet 25 is mounted for free sliding movement in a vertical plane on a square rod 28 and, therefore, follows the movement of bar magnet 22 which, being attached to valve stem 12, moves with it in response to movements initiated by the motor 21. Thus, by noting the position of the pointed end 26 of the magnet 25, an operator may be apprised of the position of the valve element 11 at any time. This indicator, in common with the valve transmission, operates through the sealed housing 14 and hence has no deleterious effect upon the safety of the arrangement as a whole.

While the illustration of Fig. 1 is concerned with the operation of a valve of the reciprocating type, the invention is equally applicable to the operation of rotary valves of the butterfly type. In Figs. 2 and 3 such an arrangement is illustrated, a butterfly valve 27 being mounted on a shaft 46 for rotary movement within a conduit 13 which may contain poisonous or corrosive gas which cannot be permitted to leak into the surrounding atmosphere. One end of said shaft is supported by bearing 28. The opposite end is journalled at 29 and 30. This latter end carries a driven spider 31 (Fig. 3) having a toothed, soft iron rotor 32 mounted in close proximity to an annular diaphragm 33, which serves as a seal to prevent escape of toxic fluid that may have passed out of the conduit 13 by way of bearing 29. Without the diaphragm 33 is a series of permanent magnet pole pieces 35. These are secured by bolts 34 and 36 to a wheel 37, which, in turn, is affixed to a driving spider 38. Connecting rod 39 is secured to the spider 38 and serves to move the spider in response to the deflection of a diaphragm motor 21.

In operation, a conventional pilot valve 40 (Fig. 2) may be connected with a zone (not illustrated) containing gas under pressure. Small fluctuations in such pressure actuate the pilot valve, which regulates a flow of air pressure to diaphragm motor 21 in a well known manner. Movement of diaphragm 41 (Fig. 3) is transmitted through shaft 42 to a lever 43 which is pivoted at 44. Movement of lever 43 is transmitted to connecting rod 39, which drives spider 38 through a connection 45. Movement of the driving spider 38 and the magnets carried thereby, causes a corresponding movement of the inner, driven spider 31. This imparts a rotary motion to shaft 46 and causes butterfly valve 27 to assume any desired position from fully open to fully closed.

While rotor 32 has been described as of soft iron, it is of course possible to substitute therefor an arrangement of permanent magnets in the manner illustrated in Fig. 1. In such a case, the magnets should be so placed that the polarity of the magnets on one side of the diaphragm 33 is opposite to the polarity on the other side thereof.

A magnetic indicator of the sort shown in Fig. 1 may be incorporated in the device of Figs. 2 and 3 in order to show the position of the butterfly valve within conduit 13. This may be accomplished by providing an end of shaft 46 with permanent magnets 47 which may then be arranged to drive an indicator in a manner similar to that shown in connection with Fig. 1.

In constructing a valve in accordance with the teachings of the present invention, materials should be employed which will resist corrosive action of the fluid with which they will come in contact. Monel metal has proven satisfactory for the butterfly valve, diaphragm 33 and associated parts. The iron rotor 32 may be plated with nickel as a protective measure. The shaft 46 may be aluminum bronze.

By means of this invention it is possible to adjust the position of a sealed valve assembly without the use of bellows and without danger of leakage. It will be readily apparent to one skilled in the art that many alterations and substitutions may be made without departing from the spirit of this invention, two illustrative embodiments of which have been described. Such embodiments are to be construed as illustrative only and not as limitations upon this invention, the scope of which is defined in the appended claims.

What is claimed is:

1. Magnetic actuating means for a butterfly valve positioned within a conduit and mounted upon a stem extending through a wall of said conduit and journaled in a housing said actuating means comprising an inner spider secured to said stem, a permanently magnetized rotor carried by said spider and having a plurality of teeth arranged around the periphery thereof, said teeth comprising a first group of pole pieces, an annular sealing diaphragm concentric with and surrounding said pole pieces, said diaphragm being permanently sealed to the housing and defining therewith a sealed zone, an outer spider rotatably mounted coaxially with said stem and said inner spider, a plurality of permanently magnetized teeth mounted on said outer spider and constituting a second group of pole pieces, said first and second groups of pole pieces being arranged concentrically and magnetically coupled, whereby rotation of said outer spider is transmitted to said inner spider.

2. Magnetic actuating means as in claim 1 wherein the teeth in each of the groups of pole pieces are evenly spaced, and wherein the two groups of pole pieces are arranged in both a concentric and coplanar relationship whereby a uniform torque is produced for all positions of the valve stem.

JEROME B. McMAHON.
THOMAS A. ABBOTT.

REFERENCES CITED

The following references are of record in the file of this patent:

UNITED STATES PATENTS

| Number | Name | Date |
|---|---|---|
| Re. 20,768 | Kraus | June 21, 1938 |
| 2,100,805 | Hufford | Nov. 30, 1937 |
| 2,211,664 | Leibing | Aug. 30, 1940 |
| 2,241,983 | Connolly | May 13, 1941 |
| 2,248,030 | Zwack | July 1, 1941 |
| 2,289,574 | Carlson | July 14, 1942 |
| 2,307,723 | Anderson | Jan. 5, 1943 |
| 2,346,904 | Carlson | Apr. 18, 1944 |
| 2,371,511 | Faus | Mar. 13, 1945 |